(12) United States Patent
Jang et al.

(10) Patent No.: US 8,003,727 B2
(45) Date of Patent: Aug. 23, 2011

(54) SCRATCH-RESISTANT FLAME RETARDANT THERMOPLASTIC RESIN COMPOSITION

(75) Inventors: Bok Nam Jang, Anyang-Si (KR); In Chul Jung, Seoul (KR); Hee Jung Park, Guri-Si (KR); Doo Han Ha, Yeosu-Si (KR); Jin Hwan Choi, Anyang-Si (KR)

(73) Assignee: Cheil Industries Inc., Gumi-si (KR)

( * ) Notice: Subject to any disclaimer, the term of this patent is extended or adjusted under 35 U.S.C. 154(b) by 77 days.

(21) Appl. No.: 11/951,531

(22) Filed: Dec. 6, 2007

(65) Prior Publication Data
US 2008/0146726 A1 Jun. 19, 2008

(30) Foreign Application Priority Data
Dec. 13, 2006 (KR) .................. 10-2006-0127265

(51) Int. Cl.
*C08F 283/08* (2006.01)
(52) U.S. Cl. .................. 524/508; 524/509; 524/511
(58) Field of Classification Search .................. 524/508, 524/509, 511
See application file for complete search history.

(56) References Cited

U.S. PATENT DOCUMENTS

| 4,027,073 | A | 5/1977 | Clark |
| 4,287,315 | A | 9/1981 | Meyer et al. |
| 4,742,104 | A | 5/1988 | Lindner et al. |
| 5,036,126 | A | 7/1991 | Rinehart et al. |
| 5,292,786 | A | 3/1994 | Gaggar et al. |
| 6,174,943 | B1 * | 1/2001 | Matsumoto et al. .......... 524/115 |
| 2005/0159546 | A1 * | 7/2005 | Weber et al. .................... 525/67 |

FOREIGN PATENT DOCUMENTS

| DE | 2019325 A1 | 11/1971 |
| EP | 0463368 A | 1/1992 |
| KR | 2004-79118 | 9/2004 |
| KR | 2006-111868 | 11/2006 |

OTHER PUBLICATIONS

European Search Report for corresponding European Application No. 07023649, mailed Mar. 20, 2008.

* cited by examiner

*Primary Examiner* — Peter D Mulcahy
(74) *Attorney, Agent, or Firm* — Summa, Additon & Ashe, P.A.

(57) ABSTRACT

Disclosed herein is a scratch resistant flame retardant thermoplastic resin composition comprising: 100 parts by weight of a base resin comprising (A) about 1 to about 99% by weight of a polycarbonate resin and (B) about 99 to about 1% by weight of a modified methacrylate resin; and (C) about 1 to about 50 parts by weight of a flame retardant.

12 Claims, No Drawings

SCRATCH-RESISTANT FLAME RETARDANT THERMOPLASTIC RESIN COMPOSITION

CROSS-REFERENCE TO RELATED APPLICATION

This non-provisional application claims priority under 35 USC Section 119 from Korean Patent Application No. 10-2006-127265, filed on Dec. 13, 2006, which is hereby incorporated by reference in its entirety.

FIELD OF THE INVENTION

The present invention relates to a flame retardant thermoplastic resin composition with good scratch-resistance.

BACKGROUND OF THE INVENTION

Resins with various characteristics are used in the production of electric and electronic goods. Many such goods are becoming increasingly specialized and are also increasing in size, and yet are advantageously light weight. Electric and electronic goods should also have good scratch-resistance to maintain the appearance of the goods and good flame retardancy.

One method for achieving scratch-resistance and flame retardancy is to alloy a polycarbonate resin with a methacrylate, preferably a polycarbonate resin with polymethyl methacrylate (PMMA).

Polycarbonate resin is widely used in the production of electric or electronic goods, automobiles and other products because the resin has desirable properties such as good mechanical strength, transparency, heat stability, self extinction, dimension stability, and the like. Also polycarbonate resin can be rendered flame retardant using smaller amounts of flame retardant as compared with other conventional polymers because the chemical structure of polycarbonate resin lends itself to good flame retardancy.

However, the scratch-resistance of polycarbonate resin is not good, that is, about B grade of pencil hardness. Therefore, good scratch-resistance cannot be obtained with polycarbonate resin only.

Although polymethyl methacrylate resin has good scratch-resistance, generally about 3H grade of pencil hardness, it can be difficult to impart the desired degree of flame retardancy to the resin using conventional flame retardants.

Korean Patent Application No. 2006-111868 discloses a blend with good scratch-resistance as well as flame retardancy comprising polycarbonate resin and an alkyl (meth) acrylate such as polymethyl methacrylate. However, the polycarbonate resin is not highly compatible with the polymethyl methacrylate. Accordingly the blend separates into its respective phases even though the blend is processed at a high temperature. Further, the refraction index of polycarbonate resin is 1.59 and that of PMMA is 1.49. Thus, the alloy of polycarbonate resin and PMMA cannot obtain a bright color by light scattering, and the alloy shows an apparent weld line which is a defect. Accordingly, the blend is still not adequate for the production of electric or electronic goods.

Korean Patent Publication No. 2004-79118 discloses using a metal stearic acid ester to reduce the molecular weight of polycarbonate resin during the blending process in order to improve the compatibility of polycarbonate resin and PMMA. However, the blend exhibits poor mechanical properties.

U.S. Pat. No. 4,287,315 teaches polymer blends with improved impact strength consisting of polyamide and a high molecular weight olefinic copolymer. However, the blends have limited transparency.

U.S. Pat. No. 4,027,073 discloses an article comprising a solid substrate coated with a pigment free coating composition. In the patent, an additional coating process is required.

SUMMARY OF THE INVENTION

One aspect of the invention is a flame retardant thermoplastic resin composition which can exhibit improved scratch-resistance properties. To resolve the problems above, the present inventors have employed a modified methacrylate resin for blending with polycarbonate resin. The blend of the present invention can exhibit good compatibility between the polycarbonate resin and methacrylate resin, which can significantly reduce the appearance of a weld line. In addition, the blend can obtain bright coloring by reducing the difference between the refraction index of the polycarbonate resin and the methacrylate resin. The blend of the invention can also exhibit other desirable properties such as good impact strength.

The flame retardant thermoplastic resin composition of the invention can include a polycarbonate resin (A), a modified methacrylate resin (B) and a flame retardant (C).

In exemplary embodiments of the invention, the flame retardant thermoplastic resin composition comprises 100 parts by weight of a base resin comprising (A) about 1 to about 99% by weight of a polycarbonate resin and (B) about 99 to about 1% by weight of a modified methacrylate resin and (C) about 1 to about 50 parts by weight of a flame retardant based on 100 parts by weight of (A) and (B).

In certain embodiments, the flame retardant thermoplastic resin composition comprises 100 parts by weight of a base resin comprising (A) about 20 to about 80% by weight of polycarbonate resin and (B) about 20 to about 80% by weight of a modified methacrylate resin, and (C) about 1 to about 50 parts by weight of a flame retardant based on 100 parts by weight of (A) and (B).

The flame retardant thermoplastic resin composition may further comprise an impact modifier (D). The impact modifier (D) can be present in an amount of about 1 to about 30 parts by weight, based on 100 parts by weight of the base resin.

The modified methacrylate resin is a copolymer of a monofunctional monomer component comprising methyl methacrylate (MMA) and a difunctional monomer. In exemplary embodiments of the invention, the copolymer includes the monofunctional monomer component in an amount of about 60 to about 99.9% by weight, and the difunctional monomer in an amount of about 0.1 to about 40% by weight. The modified methacrylate copolymer includes MMA in an amount of about 50 to about 99.9% by weight.

In various embodiments of the invention, the monofunctional monomer component includes MMA, and further includes another monofunctional monomer copolymerizable with MMA. The copolymerizable monomer can include at least one copolymerizable monomer selected from the group consisting of monofunctional unsaturated monomers such as methacrylates other than MMA, acrylates, unsaturated carboxylic acids, acid anhydrides, and monofunctional vinyl group-containing monomers.

Another aspect of the invention provides a pellet extruded from the foregoing flame retardant thermoplastic resin composition. Another aspect of the invention relates to a housing of an electric or electronic article molded from the foregoing flame retardant thermoplastic resin composition

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The aromatic polycarbonate resin of the present invention may be prepared by reacting a diphenol represented by Chemical Formula 1 with a phosgene or a carbonic diester.

[Chemical Formula 1]

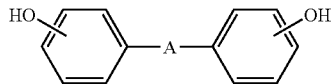

wherein A is a single bond, a $C_{1-5}$ alkylene group, a $C_{1-5}$ alkylidene group, a $C_{5-6}$ cycloalkylidene group, S or $SO_2$.

Examples of diphenols of Chemical Formula 1 may include without limitation hydroquinol, resocinol, 4,4'-dihydroxy diphenyl, 2,2-bis-(4-hydroxyphenyl)-propane ("bisphenol A"), 2,4-bis-(4-hydroxyphenyl)-2-methyl butane, 1,1-bis-(4-hydroxyphenyl)-cyclohexane, 2,2-bis-(3-chloro-4-hyroxyphenyl)-propane, 2,2-bis-(3,5-dichloro-4-hydroxyphenyl)-propane, and the like, and mixtures thereof.

The polycarbonate resin according to the present invention may have a weight average molecular weight (Mw) of about 10,000 to about 200,000, for example about 15,000 to about 80,000.

In accordance with various embodiments of the invention, suitable polycarbonates incorporated into the composition of the present invention may be branched in a known manner. For example, such branched polycarbonates can be prepared by incorporating about 0.05 to about 2 mol %, based on the total quantity of diphenols used, of tri- or higher functional compounds, for example, those with three or more phenolic groups.

In exemplary embodiments, the composition of the invention can include the polycarbonate resin in an amount of about 1 to about 99% by weight, for example about 20 to about 80% by weight, based on the total weight of the base resin. Such compositions can exhibit a good balance of flame retardancy, mechanical strength and scratch-resistance.

(B) Modified Methacrylate Resin

The modified methacrylate resin can exhibit improved compatibility with polycarbonate resin. Compositions of the invention including the modified methacrylate resin can also exhibit improved colorability, reduced difference in refraction index, and improved weld line strength.

The modified methacrylate resin may be prepared by polymerizing a monofunctional monomer component comprising methyl methacrylate (MMA) and a difunctional monomer.

The modified methacrylate copolymer can include the monofunctional monomer component in an amount of or greater than about 60% by weight, for example about 60 to about 99.9% by weight, and as another example about 80 to about 99.9% by weight. If the amount of the monofunctional monomer component is less than about 60% by weight, the methacrylate copolymer may have poor transparency and mechanical strength.

In exemplary embodiments of the invention, the monofunctional monomer component consists essentially of MMA. In other exemplary embodiments of the invention, the monofunctional monomer component may include MMA and can further include one or more other monofunctional monomers that can be copolymerized with MMA.

MMA can be present in an amount of about 50 to about 99.9% by weight, for example about 70 to about 99% by weight, in the modified methacrylate copolymer. If MMA is present in an amount less than about 50% by weight, the scratch-resistance and mechanical strength of the modified methacrylate copolymer can deteriorate. If MMA is present in an amount more than about 99.9% by weight, the methacrylate copolymer may show poor compatibility with polycarbonate resin.

Exemplary monofunctional monomers that are copolymerizable with MMA may include without limitation an unsaturated monomer selected from methacrylates (other than MMA), acrylates, unsaturated carboxylic acids, acid anhydrides, monofunctional vinyl group containing monomers, and the like. These monomers can be used alone or in combination with one another.

Examples of monofunctional monomers useful in the present invention may include, but are not limited to, ethyl methacrylate, propyl methacrylate, butyl methacrylate and benzyl methacrylate; methyl acrylate, ethyl acrylate, propyl acrylate, butyl acrylate, 2-ethylhexyl acrylate; acrylic acid, methacrylic acid, maleic anhydride; styrene, acrylonitrile, methacrylonitrile and the like. These monofunctional monomers can be used alone or in combination with one another.

The difunctional monomer for the present invention may be a difunctional compound which contains a vinyl group such as methacrylate and further a different functional group such as an epoxy or hydroxy. Examples of suitable difunctional monomers useful in the present invention may include, but are not limited to, glycidyl methacrylate, allyl glycidyl ether, methacrylic acid anhydride, 2-hydroxy ethyl acrylate, 2-hydroxypropyl acrylate, monoglycerol acrylate, and the like. These difunctional monomers can be used alone or in combination with one another.

The difunctional monomer may be present in an amount of less than about 40% by weight in the modified methacrylate copolymer, for example about 0.1 to about 40% by weight, and as another example about 0.1 to about 20% by weight.

The difunctional monomer can be used in the present invention to improve the refraction index of polymethacrylate and the compatibility with polycarbonate resin.

A chain transfer agent and an antioxidant may be added in the copolymer to control molecular weight and heat stability of the modified methacrylate resin. The amount of the chain transfer agent may vary, for example in the range of about 0.02 to about 10 parts by weight. The modified methacrylate resin can be prepared via polymerization techniques including, but not limited to, emulsion polymerization, bulk polymerization, suspension polymerization and the like.

The polycarbonate resin and the modified methacrylate resin constitute a base resin of the present invention. The modified methacrylate resin is present in the base resin in an amount of about 1 to about 99% by weight, for example about 20 to about 80% by weight, to obtain good scratch-resistance and flame retardancy.

(C) Flame Retardant

The flame retardant for the present invention is not limited. For example, phosphorous containing flame retardants, halogen containing flame retardants, and mixtures thereof can be employed.

The phosphorous containing flame retardant may be a phosphorous compound. Examples of the phosphorous compound may include red phosphorus, phosphate, phosphonate, phosphinate, phosphine oxide, phosphazene, a metal salt thereof and the like. These phosphorous compounds can be used alone or in combination with one another.

The halogen containing flame retardant may be a halogen compound. Examples of the halogen compound may include decabromodiphenyl ether, decabromodiphenyl ethane, tetra bromo bisphenol A, tetrabromobisphenol A-epoxy oligomer, octabromotrimethyl phenyl indane, ethylene bis-tetrabromophthalimide, tris(tribromophenol) triazine, bromopolystyrene, and the like. These halogen compounds can be used alone or in combination with one another. The halogen compound can melt at conventional processing temperatures, and as an example, the halogen compound can have a melting point or softening point below about 250° C.

When a halogen compound is employed in the present invention, an inorganic compound such as antimony trioxide or antimony pentaoxide may be used together with the halogen compound.

The flame retardant can be present in the composition in an amount of about 1 to about 50 parts by weight, per 100 parts by weight of the base resin. If the composition includes the flame retardant in an amount of less than about 1 part by weight, the flame retardancy of the composition may be weak. On the other hand, if the flame retardant is used in an amount of greater than about 50 parts by weight, the mechanical properties of the composition, such as impact strength, may deteriorate.

(D) Impact modifier

The thermoplastic resin composition according to the present invention may optionally contain an impact modifier. Exemplary impact modifiers useful in the present the present invention can include a grafted copolymer or an olefinic copolymer.

The grafted copolymer can be prepared by polymerizing at least one rubber monomer selected from the group consisting of diene rubber monomers, acrylate rubber monomers, and silicone rubber monomers, and grafting the rubber polymer with styrene, α-methyl styrene, alkyl-substituted styrene, acrylonitrile, methacrylonitrile, methylmethacrylate, maleic acid anhydride, alkyl or phenyl nuclear-substituted maleimide, or a mixture thereof. The amount of rubber component in the impact modifier can range from about 20 to about 80% by weight.

Examples of the diene rubber may include butadiene and isoprene, and the like, and mixtures thereof. Butadiene is a representative example.

Examples of the acrylate rubber may include a homopolymer or copolymer of methyl acrylate, ethyl acrylate, n-propyl acrylate, n-butyl acrylate, 2-ethyl hexyl acrylate, hexyl methacrylate, 2-ethyl hexyl methacrylate, and the like, and mixtures thereof.

The silicone rubber may be prepared from cyclosiloxane, such as hexamethyl cyclotrisiloxane, octa methylcyclotetra siloxane, decamethylcyclopentasiloxane, dodecamethylcyclohexasiloxane, trimethyl triphenyl cyclotrisiloxane, tetramethyl tetraphenyl cyclotetrasiloxane, octaphenyl cyclotetrasiloxane, and the like, and mixtures thereof. At least one cyclosiloxane may be employed for silicone rubber.

Further, ethylene/propylene rubber or ethylene/propylene/diene terpolymer (EPDM) and the like may be used.

The amount of impact modifier, when present, can vary, depending on the particular end use of the composition. The impact modifier may be present in the composition in an amount of about 1 to about 30 parts by weight, for example about 2 to about 10 parts by weight, per 100 parts by weight of the base resin of (A) and (B). When the impact modifier is present in an amount less than about 1 part by weight, the impact strength effect on the blend is weak. When the impact modifier is present in an amount greater than about 30 parts by weight, the processability, heat resistance, and heat stability of the composition may deteriorate.

Other additives may be contained in the thermoplastic resin composition of the present invention. The additives may include anti-dropping agents such as polytetrafluoroethylene, weather stabilizers, flame retardant aids, anti-oxidants, plasticizers, heat stabilizers, light stabilizers, compatibilizers, pigments, dyes, inorganic fillers, and the like, and mixtures thereof.

The resin composition according to the present invention can be prepared by a conventional process. For example, all the components and additives can be mixed together and extruded through an extruder and can be prepared in the form of pellets.

The resin composition of the present invention can be molded into various consumer and electric or electronic goods, such as TV housings, audio sets, cassette players, washing machines, computers, monitors, MP3 players, video players, CD players, dish washers, office equipment, and the like.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES (A) Polycarbonate resin (PC)

Panlite L-1225 Grade manufactured by Teijin Co. of Japan is used.

(B) Modified Methyl Methacrylate ($B_1$) Modified Polymethyl Methacrylate (m-PMMA)

95 parts methyl methacrylate and 3 parts methyl acrylate parts as monofunctional monomers, and 2 parts glycidyl methacrylate as a difunctional monomer are mixed to prepare a monomer mixture solution. To the monomer mixture solution are added 0.3 parts of lauroyl peroxide, 0.2 parts of octadecyl 3-(3,5-di-tertiary butyl-4-hydroxy phenyl) propionate, and 0.18 parts of n-octylmercaptane, and uniformly mixed.

0.1 parts sodium polyacrylate is dissolved in 150 parts ion-exchanged water in a stainless high pressure reactor equipped with an agitator. To the solution are added a small amount of disodium hydrogen phosphate and sodium sulphate as suspension stabilizing agent. The solution is added into the monomer mixture solution, the mixture is radically agitated in the reactor, the reactor is filled with an inert gas such as nitrogen or argon, and the reactor is heated. The polymerization in the reactor is carried out at 72° C for 2 hours, and at 110° C. for 1 hour. After completion of polymerization, the polymer particles are obtained through washing, dehydrating and drying. The weight average molecular weight is measured as 97,000 and the number average molecular weight as 50,000 for the modified methacrylate resin obtained.

($B_2$) Polymethylmethacrylate (PMMA)

Polymethylmethacrylate is prepared in the same manner as in m-PMMA ($B_1$) except that 97 parts methyl methacrylate and 3 parts methyl acrylate as monofunctional monomers are used. The weight average molecular weight is measured as 92,000 and the number average molecular weight as 46,000 for the polymethyl methacrylate (PMMA) obtained.

(C) Flame Retardant ($C_1$) Aromatic Phosphate Ester Compound (CR-741)

Bisphenol A diphosphate (CR-741) prepared by Daihachi chemical Co. (Japan) is employed.

($C_2$) Halogen Compound (FR-245)

Tris(tribromophenyl) triazine (FR-245) with 67% of bromine prepared by ICL Co. (Israel) is employed.

(D) Impact modifier (MBS: Methylmethacrylate-Butadiene-Styrene)

A grafted copolymer (MBS) in which methylmethacrylate and styrene are grafted to butadiene rubber, which is prepared by MRC Co. as C223-A Grade, is employed.

(E) Antidropping Agent (PTFE: Polytetrafluoroethylene)

Teflon manufactured by Dupont Company (U.S.A.) is employed.

Examples 1-4 and Comparative Examples 1-4

The components as shown in Table 1 are mixed and the mixture is extruded at 220 to 260° C. with a conventional twin screw extruder in pellets. The resin pellets are dried at 80° C. for 3 hours, and molded into test specimens using a 8 oz injection molding machine at 250° C. with a barrel temperature of 60° C.

The physical properties of the test specimens are measured as follows.

(1) Flame Retardancy: The flame retardancy of the specimens is measured in accordance with UL 94V regulations at 2.5 mm thickness.

(2) Izod Impact Strength: The notch Izod impact strength is measured in accordance with ASTM. D-256 (⅛ inch, kgf m/cm).

(3) Pencil Hardness: The pencil hardness is measured for the specimens of 10×10 cm² after exposure at 23° C. and 50% of relative humidity for 48 hours in accordance with JIS K-5401. The scratch-resistance is measured by 3B, 2B, B, HB, F, H, 2H, 3H etc. The higher the H value, the better the scratch resistance is. The higher the B value, the lower the scratch resistance is.

(4) Appearance: The transparency, color, and weld line are measured by naked eyes. For the appearance of a molded article to be good, the transparency should be high, the color should be non-color, and the weld line weak.

TABLE 1

| components | Examples | | | | Comparative Examples | | | |
|---|---|---|---|---|---|---|---|---|
| | 1 | 2 | 3 | 4 | 1 | 2 | 3 | 4 |
| PC(A) | 70 | 70 | 50 | 50 | 70 | 70 | 50 | 50 |
| m-PMMA($B_1$) | 30 | 30 | 50 | 50 | — | — | — | — |
| PMMA ($B_2$) | — | — | — | — | 30 | 30 | 50 | 50 |
| CR-741 ($C_1$) | 18 | 18 | 15 | 15 | 18 | 18 | 15 | 15 |
| FR-245 ($C_2$) | — | — | 15 | 15 | — | — | 15 | 15 |
| MBS (D) | — | 6 | — | 6 | — | 6 | — | 6 |
| PTFE (E) | 0.7 | 0.7 | 0.7 | 0.7 | 0.7 | 0.7 | 0.7 | 0.7 |
| Izod Impact Strength | 2.5 | 11.5 | 2.1 | 10.3 | 1.7 | 8.3 | 1.5 | 7.6 |
| UL 94 | V0 | V0 | V0 | V0 | V0 | V0 | V0 | V0 |
| Pencil Hardness | F | F | H | H | F | F | H | H |
| Transparency And Color | T*/ white | O*/ white | T*/ white | O*/ white | O*/ pearl | O*/ pearl | O*/ pearl | O*/ pearl |
| Weld Line | weak | weak | weak | weak | clear | clear | clear | clear |

T*: Translucent
O*: Opaque

According to the Examples above, the resin compositions employing a modified polymethyl methacrylate ($B_1$) show a pencil hardness of F grade or higher, a flame retardancy of V0, and a good appearance. As shown in Examples 1 and 3 in which an impact modifier is not added, the specimens showed translucent appearance. Examples 2 and 4 in which an impact modifier is added showed a lowered transparency. However, as the weld line is weak in the latter cases, the resin composition can be used as articles that require good appearance and good impact strength. On the other hand, in the Comparative Examples in which a conventional methyl methacrylate ($B_2$) is employed, the resin composition is opaque regardless of impact modifier, and showed a pearl color (due to a refractive index difference between incompatible polymers) and a clear weld line.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A scratch resistant flame retardant thermoplastic resin composition consisting essentially of:
    100 parts by weight of a base resin consisting essentially of
        (A) about 1 to about 99% by weight of a polycarbonate resin and (B) about 99 to about 1% by weight of a modified methacrylate resin, wherein said modified methacrylate resin is a copolymer consisting of about 50 to about 99.9% by weight methyl methacrylate (MMA), a difunctional monomer selected from the group consisting of glycidyl methacrylate, allyl glycidyl ether, methacrylic acid anhydride, 2-hydroxy ethyl acrylate, 2-hydroxypropyl acrylate, monoglycerol acrylate, and mixtures thereof, and optionally at least one additional monofunctional unsaturated monomer selected from the group consisting of methacrylates other than MMA, acrylates, unsaturated carboxylic acids, acid anhydrides and monofunctional vinyl group-containing monomers;
(C) about 1 to about 50 parts by weight of a flame retardant; and
optionally an additive selected from the group consisting of an impact modifier, flame retardant aids, anti-dropping agents, weather stabilizers, antioxidants, plasticizers, heat stabilizers, light stabilizers, compatibilizers, pigments, dyes, inorganic fillers, and mixtures thereof.

2. The scratch resistant flame retardant thermoplastic resin composition of claim 1, wherein said copolymer comprises said MMA and said additional monofunctional unsaturated monomer in an amount of about 60 to about 99.9% by weight, and said difunctional monomer in an amount of about 0.1 to about 40% by weight.

3. The scratch resistant flame retardant thermoplastic resin composition of claim 1, wherein said optional monofunctional unsaturated monomer monomer is selected from the group consisting of ethyl methacrylate, propyl methacrylate, butyl methacrylate, benzyl methacrylate, methyl acrylate, ethyl acrylate, propyl acrylate, butyl acrylate, 2-ethylhexyl acrylate, acrylic acid, methacrylic acid, maleic anhydride, styrene, acrylonitrile, methacrylonitrile, and mixtures thereof.

4. The scratch resistant flame retardant thermoplastic resin composition of claim 1, wherein said base resin comprises (A) about 20 to about 80% by weight of the polycarbonate resin and (B) about 80 to about 20% by weight of the modified methacrylate resin.

5. A pellet extruded from a flame retardant thermoplastic resin composition consisting essentially of:
100 parts by weight of a base resin consisting essentially of (A) about 1 to about 99% by weight of a polycarbonate resin and (B) about 99 to about 1% by weight of a modified methacrylate resin, wherein said modified methacrylate resin is a copolymer consisting of about 50 to about 99.9% by weight methyl methacrylate (MMA), a difunctional monomer selected from the group consisting of glycidyl methacrylate, allyl glycidyl ether, methacrylic acid anhydride, 2-hydroxy ethyl acrylate, 2-hydroxypropyl acrylate, monoglycerol acrylate, and mixtures thereof, and optionally at least one monofunctional unsaturated monomer selected from the group consisting of methacrylates other than MMA, acrylates, unsaturated carboxylic acids, acid anhydrides and monofunctional vinyl group-containing monomers;
(C) about 1 to about 50 parts by weight of a flame retardant; and
optionally an additive selected from the group consisting of an impact modifier, flame retardant aids, anti-dropping agents, weather stabilizers, antioxidants, plasticizers, heat stabilizers, light stabilizers, compatibilizers, pigments, dyes, inorganic fillers, and mixtures thereof.

6. The pellet of claim 5, wherein said copolymer comprises said MMA and said additional monofunctional unsaturated monomer in an amount of about 60 to about 99.9% by weight, and said difunctional monomer in an amount of about 0.1 to about 40% by weight.

7. A housing of an article molded from a flame retardant thermoplastic resin composition consisting essentially of:
100 parts by weight of a base resin consisting essentially of (A) about 1 to about 99% by weight of a polycarbonate resin and (B) about 99 to about 1% by weight of a modified methacrylate resin, wherein said modified methacrylate resin is a copolymer consisting of about 50 to about 99.9% by weight methyl methacrylate (MMA), a difunctional monomer selected from the group consisting of glycidyl methacrylate, allyl glycidyl ether, methacrylic acid anhydride, 2-hydroxy ethyl acrylate, 2-hydroxypropyl acrylate, monoglycerol acrylate, and mixtures thereof, and optionally at least one monofunctional unsaturated monomer selected from the group consisting of methacrylates other than MMA, acrylates, unsaturated carboxylic acids, acid anhydrides and monofunctional vinyl group-containing monomers;
(C) about 1 to about 50 parts by weight of a flame retardant; and
optionally an additive selected from the group consisting of an impact modifier, flame retardant aids, anti-dropping agents, weather stabilizers, antioxidants, plasticizers, heat stabilizers, light stabilizers, compatibilizers, pigments, dyes, inorganic fillers, and mixtures thereof.

8. The housing of claim 7, wherein said article is an electric or electronic article.

9. The scratch resistant flame retardant thermoplastic resin composition of claim 1, wherein said impact modifier is selected from the group consisting of graft copolymers prepared by polymerizing at least one rubber monomer and grafting the rubber polymer with styrene, a-methyl styrene, alkyl-substituted styrene, acrylonitrile, methacrylonitrile, methyl methacrylate, maleic acid anhydride, alkyl or phenyl nuclear-substituted maleimide, or a mixture thereof; and olefinic copolymers.

10. The scratch resistant flame retardant thermoplastic resin composition of claim 1, consisting of said base resin consisting of said (A) polycarbonate resin and said (B) modified methacrylate resin; said (C) flame retardant; said (D) optional impact modifier; and said optional additive.

11. The pellet of claim 5, wherein said flame retardant thermoplastic resin composition consists of said base resin consisting of said (A) polycarbonate resin and said (B) modified methacrylate resin; said (C) flame retardant; said (D) optional impact modifier; and said optional additive.

12. The housing of claim 7, wherein said flame retardant thermoplastic resin composition consists of said base resin consisting of said (A) polycarbonate resin and said (B) modified methacrylate resin; said (C) flame retardant; said (D) optional impact modifier; and said optional additive.

* * * * *